US012317175B2

(12) United States Patent
Gramacho et al.

(10) Patent No.: US 12,317,175 B2
(45) Date of Patent: May 27, 2025

(54) APPARATUS AND METHOD FOR DETERMINING METRICS WITH RESPECT TO A PARTITION

(71) Applicant: Emory University, Atlanta, GA (US)

(72) Inventors: Sergio Luis Dias Lima Gramacho, Atlanta, GA (US); Avani Wildani, Atlanta, GA (US)

(73) Assignee: Emory University, Atlanta, GA (US)

( * ) Notice: Subject to any disclaimer, the term of this patent is extended or adjusted under 35 U.S.C. 154(b) by 257 days.

(21) Appl. No.: 17/433,899

(22) PCT Filed: Feb. 25, 2020

(86) PCT No.: PCT/US2020/019722
§ 371 (c)(1),
(2) Date: Aug. 25, 2021

(87) PCT Pub. No.: WO2020/176525
PCT Pub. Date: Sep. 3, 2020

(65) Prior Publication Data
US 2022/0167253 A1 May 26, 2022

Related U.S. Application Data

(60) Provisional application No. 62/810,004, filed on Feb. 25, 2019.

(51) Int. Cl.
*H04W 48/16* (2009.01)
*H04B 17/309* (2015.01)
(Continued)

(52) U.S. Cl.
CPC .......... *H04W 48/16* (2013.01); *H04B 17/309* (2015.01); *H04W 24/02* (2013.01);
(Continued)

(58) Field of Classification Search
CPC ..... H04W 48/16; H04W 48/08; H04W 48/20; H04W 24/02; H04W 84/18; H04B 17/309
See application file for complete search history.

(56) References Cited

U.S. PATENT DOCUMENTS 7,689,224 B2   3/2010   Chari et al.
7,996,510 B2   8/2011   Vicente
(Continued)

FOREIGN PATENT DOCUMENTS

EP        1450523 B1 *  1/2008  ....... H04L 29/12009

OTHER PUBLICATIONS

S. Gramacho, F. Gramacho and A. Wildani, "Autonomic Formation of Large-Scale Wireless Mesh Networks, " 2020 6th IEEE Conference on Network Softwarization (NetSoft), Ghent, Belgium, Aug. 12, 2020 [retrieved on Jan. 15, 2025]. Retrieved from the Internet:<URL: https://ieeexplore.ieee.org/abstract/document/9165483>, pp. 190-194, doi: 10.1109/NetSoft48620.2020.9165483.*

(Continued)

*Primary Examiner* — Omar J Ghowrwal
(74) *Attorney, Agent, or Firm* — Emory Patent Group

(57) ABSTRACT

The systems, devices, and methods provide agents that implement self-organized partitioning with the connectivity recovery through self-healing using local information. A method may include determining, by a wireless device, one or more metrics for each agent and/or for each partition of the one or more other agents using internal and neighboring state information from information with respect to validity and/or a quality of a connection by an evaluating agent of the wireless device to each partition based on an agent type of the evaluating agent. The agent type may include a first agent and a second agent. The method may further include determining, by the first wireless device, one or more agent operations to be deployed by a wireless interface of the first
(Continued)

wireless device with respect to the first agent or the second agent, based on the one or more metrics and the agent type.

20 Claims, 7 Drawing Sheets

(51) Int. Cl.
*H04W 24/02* (2009.01)
*H04W 48/08* (2009.01)
*H04W 48/20* (2009.01)
*H04W 84/18* (2009.01)

(52) U.S. Cl.
CPC ............ *H04W 48/08* (2013.01); *H04W 48/20* (2013.01); *H04W 84/18* (2013.01)

(56) References Cited

U.S. PATENT DOCUMENTS

| | | | |
|---|---|---|---|
| 8,019,352 | B2 | 9/2011 | Rappaport et al. |
| 8,532,023 | B2 | 9/2013 | Buddhikot et al. |
| 10,244,422 | B2 | 3/2019 | Parulkar |
| 2008/0291855 | A1 | 11/2008 | Bata et al. |
| 2014/0161015 | A1* | 6/2014 | Brown, III ............ H04L 45/122 370/312 |
| 2015/0011198 | A1* | 1/2015 | Wellington ........... H04W 24/02 455/418 |
| 2016/0165653 | A1* | 6/2016 | Liu ....................... H04W 72/12 370/329 |
| 2016/0192203 | A1* | 6/2016 | Gokturk ................ H04L 12/403 370/254 |

OTHER PUBLICATIONS

Gogineni, H. et al. "MMS: An autonomic network-layer foundation for network management." IEEE Journal on Selected Areas in Communications, 2010; 28(1): 15-27.

Gramacho, S. et al. "Autonomic Partitioning for the Smart Control of Wireless Mesh Networks." 2019 International Conference on Wireless and Mobile Computing, Networking and Communications (WiMob), Barcelona, Spain, 2019; 175-182.

Gramacho, S. et al. "Autonomic Formation of Large-Scale Wireless Mesh Networks." 2020 6th IEEE Conference on Network Softwarization (NetSoft), Ghent, Belgium, 2020; 190-194.

Pandey, S. et al. "Partitioning and Internetworking Wireless Mesh Network with Wired Network for Delivery Maximization and QoS Provisioning." Procedia Technology, 2012; 3:18-29.

Patil, P. et al. "Enabling Software-Defined Networking for Wireless Mesh Networks in smart environments." 2016 IEEE 15th International Symposium on Network Computing and Applications (NCA), Cambridge, Ma, USA, 2016; 153-157.

International Search Report and Written Opinion for PCT Application No. PCT/US2020/019722 dated May 15, 2020.

* cited by examiner

APPARATUS AND METHOD FOR DETERMINING METRICS WITH RESPECT TO A PARTITION

CROSS-REFERENCE TO RELATED APPLICATIONS

This application is the National Stage of International Application No. PCT/US2020/019722 filed Feb. 25, 2020, which claims the benefit of 62/810,004 filed Feb. 25, 2019. The entirety of each of these applications is hereby incorporated by reference for all purposes.

BACKGROUND

Wireless mesh networks (WMN) can provide broad coverage, at low cost. WMN can achieve wide coverage by allowing for the linkage of multiple wireless nodes while only requiring the physical connection to a network source at one node. However, real-world deployments of WMNs, such as low-cost, peer-to-peer WMNs for communication in under-served settings, have been hampered. WMNs generally have had reduced capacity at large scales and increased latency.

Solutions, such as an advanced packet scheduling mechanism and centralized control, that have attempted to address these limitations generally have had limited utility for large scale WMN, and have been difficult to implement in real world settings.

SUMMARY

Thus, there is a need for systems, methods, and/or devices that can efficiently and cost effectively increase capacity at large scales WMN, while allowing centralized control.

The methods, systems, and devices can utilize a combination of two agents that can concurrently and independently implement (i) self-organizing (later referred to as "SOrg") operations (e.g., adding or removing agent connections with respect to a partition) and self-configuring operations (e.g., changing internal attributes to reflect connectivity decisions) using local information to evolve a wireless interface controlled by a first agent into a partition constrained by network related properties (e.g., the partition diameter and the number of direct neighbors (degree) of the wireless device's wireless interfaces); such WMN partitions are isolated at the physical and link layers; or (ii) self-healing (later referred to as "SHeal") and self-configuring operations (e.g., adding/removing connections between partitions) at the local level (e.g., neighboring agents) using local information to concurrently and dynamically interconnect partitions using a wireless interface controlled by a second agent, thereby recovering broad WMN connectivity, while respecting network related partition parameters, such as diameter and node degree bounds.

Using this physical layer partitioning, the systems, devices, and methods of the disclosure can allow increased parallelism of communication flows on different partitions supported by potential frequency diversity. The autonomic properties guaranteed by the combination of the agents can bound the control latency and control workload despite the unconstrained settings (density, scale) of real-world settings, turning each partition a domain of practical multi-domain SDN control planes. The systems and methods of the disclosure can provide stable partitioning solutions efficiently and at a low-cost.

In some embodiments, a method may be provided for determining one or more agent operations including one or more connectivity operations. The method may include scanning frequencies, using a first wireless interface or a second wireless interface of a first wireless device, for broadcast messages of one or more other agents of one or more other wireless devices of a communication network disposed within communication range at a time interval for an evaluating agent of the first wireless device. The evaluating agent may be a first agent or a second agent. The first wireless interface may be configured by the first agent to control the connectivity of the first agent to a partition of one or more agents of the one or more wireless devices and the second wireless interface may be configured by the second agent to control the connectivity of the second agent to another partition of one or more agents of the one or more wireless devices. The method may include receiving a broadcast message from each agent of each wireless device of the one or more other wireless devices. The broadcast message from each of the agents may provide information regarding a state of each agent of the one or more other wireless devices and/or a state of each partition that includes at least one agent of the one or more other wireless devices. The information may include one or more partition parameters, one or more partition attributes, one or more agent attributes, or a combination thereof. The method may further include determining, by the first wireless device, one or more metrics for each agent and/or for each partition of the one or more other agents using internal and neighboring state information for the first agent and/or the second agent of the first wireless device with respect to validity and/or a quality of a connection by the first agent or the second agent to each partition based on an agent type of the evaluating agent. The method may also include determining, by the first wireless device, one or more agent operations to be deployed by the first wireless interface or the second wireless interface of the first wireless device with respect to the first agent or the second agent, based on the one or more metrics and the agent type.

In some embodiments, a wireless device or a communication node of a wireless network may be provided. The device may include at least one wireless interface; and at least one processor. The device may further include a non-transitory computer readable medium communicatively coupled to the at least one processor. The non-transitory computer readable medium having stored thereon computer software comprising at least one set of instructions corresponding to an evaluating agent that when executed by the at least processor, may cause the wireless device to scan frequencies, using the at least one wireless interface, for broadcast messages of one or more other agents of one or more other wireless devices of a communication network disposed within communication range at time interval for an evaluating agent of the first wireless device. The evaluating agent may a first agent or a second agent. A first wireless interface may be configured by the first agent to control the connectivity of the first agent to a partition of one or more agents of the one or more wireless devices and a second wireless interface may be configured by the second agent to control the connectivity of the second agent to another partition of one or more agents of the one or more wireless devices. In some embodiments, the medium storing instructions that, when executed, may further cause the wireless device to receive a broadcast message from each agent of each wireless device of the one or more other wireless devices. The broadcast message from each of the agents may provide information regarding a state of each agent of the one or more other wireless devices and/or a state of each partition that includes at least one agent of one or more other wireless devices. The information may include one or more partition parameters, one or more partition attributes, one or more agent attributes, or a combination thereof. The medium storing instructions that, when executed, may further cause the wireless device to determine one or more metrics for each agent and/or for each partition of the one or more other agents using internal and neighboring state information for the first agent and/or the second agent of the first wireless device with respect to validity and/or a quality of a connection by the first agent or the second agent to each partition based on an agent type of the evaluating agent. In some embodiments, the medium storing instructions that, when executed, may also cause the wireless device to determine one or more agent operations to be deployed by the first wireless interface or the second wireless interface of the first wireless device with respect to the first agent or the second agent, based on the one or more metrics and the agent type.

In some embodiments, each wireless interface may be capable of being communicatively coupled to a plurality of agents of the other wireless devices according to the one or more agent operations to form a partition of a mesh network.

Additional advantages of the disclosure will be set forth in part in the description which follows, and in part will be obvious from the description, or may be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The disclosure can be better understood with the reference to the following drawings and description. The components in the figures are not necessarily to scale, the emphasis being placed upon illustrating the principles of the disclosure.

DESCRIPTION OF THE EMBODIMENTS

Figure 1:
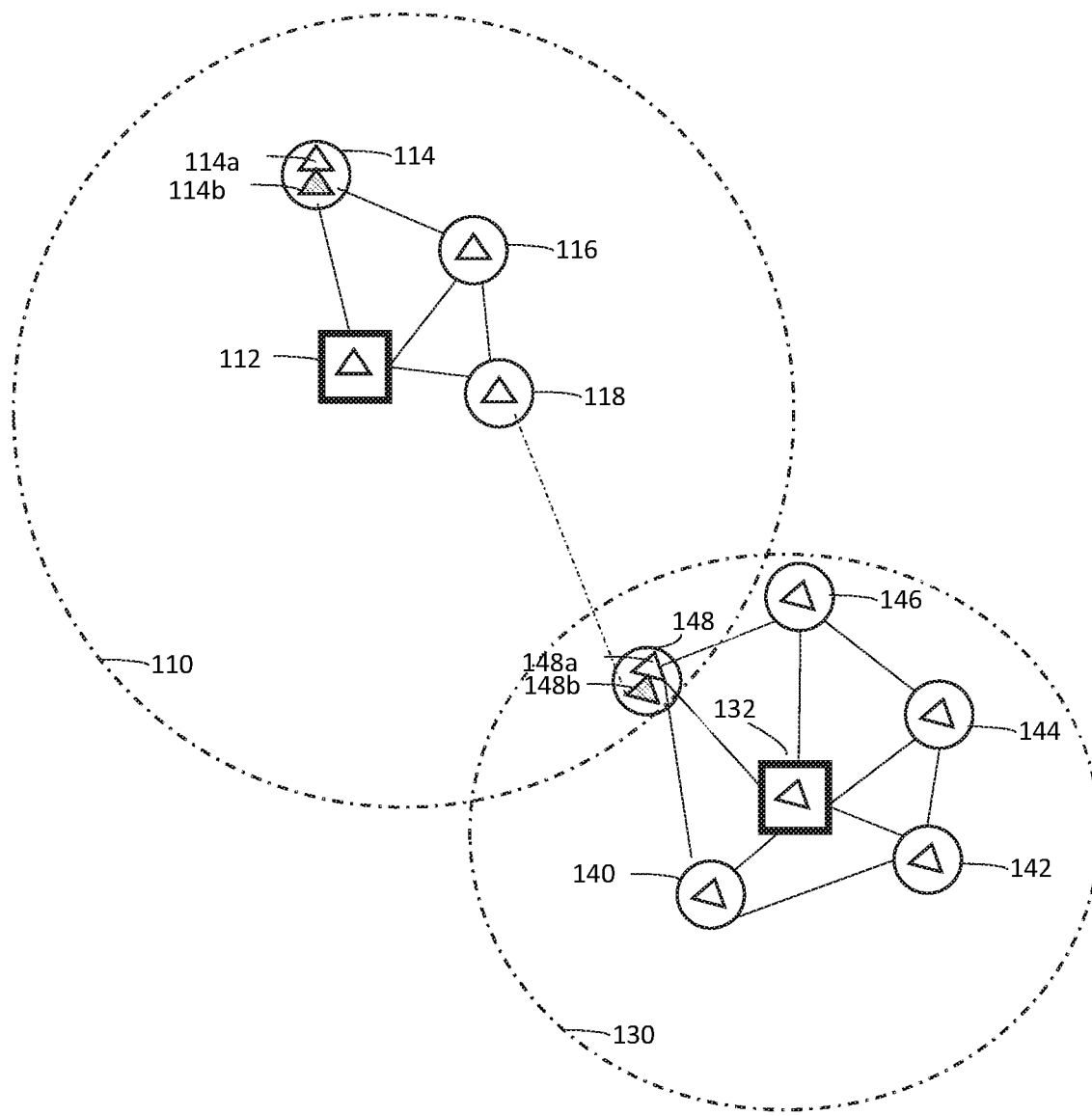
FIG. 1 illustrates an example wireless network according to embodiments.

In the following description, numerous specific details are set forth such as examples of specific components, devices, methods, etc., in order to provide a thorough understanding of embodiments of the disclosure. It will be apparent, however, to one skilled in the art that these specific details need not be employed to practice embodiments of the disclosure. In other instances, well-known materials or methods have not been described in detail in order to avoid unnecessarily obscuring embodiments of the disclosure. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

The systems, devices, and methods of the disclosure integrates the self-organized partitioning with the connectivity recovery through self-healing. In some embodiments, the systems, devices, and methods of the disclosure can use two different autonomic agents (e.g., software/program modules within a wireless device) that manipulate the formation of Wireless Mesh Network (WMN) topologies using local information (e.g., agent's internal state and state of direct neighboring nodes) by organizing a node placement into dynamic network partitions while enforcing inter-partition connectivity to promote the WMNs' capacity through density control, increased frequency diversity and multi-domain Software Defined Networks (SDN)-based network control. These agents can achieve fast convergence to stable partition sets and global re-connectivity.

In some embodiments, the systems, devices and methods of the disclosure can use a combination of two agents that implement either (i) self-organizing (later referred to as "SOrg") and self-configuring operations or (ii) self-healing (later referred to as "SHeal") and self-configuring operations, using local information of agents disposed on nearby wireless devices. In some embodiments, these agents can be software components embedded into the wireless devices (e.g., nodes). Each agent may control a wireless interface of the wireless device. The use of the agent(s) according to the disclosure can achieve a Self-Stabilizing (SS) system, where a network using agent(s) of the disclosure can start in an arbitrary configuration and recover to a legal state (safety properties in valid states) after repeated operation of the agent(s).

In some embodiments, each wireless device of the network may include a first wireless interface configured by a first agent (also referred to as "SOrg agent") to implement SOrg operations. In some embodiments, each wireless device of the network may optionally further include a second wireless interface configured by a second agent (also referred to as "SHeal agent") to implement the SHeal operations.

By way of example, only a portion of nodes of the wireless network may also include an agent providing the SHeal operations in addition to the agent providing the SOrg operations. Providing only a portion of nodes of the wireless network with the agent implementing SHeal operations can help achieve low-cost and low complexity of the disclosed network. A portion may be any number of nodes. For example, 20% of all nodes of the wireless network may also include the agent providing SHeal operations.

The agent(s) on the wireless devices can independently make operation decisions, such as connectivity decisions, thereby they collectively can lead the network to a stable topology/network formation. These decisions can be based on the agents' evaluation of one or more metrics for each partition with respect to safety and liveness properties. This way, each agent can determine whether an association with a partition candidate would be valid if implemented by the respective wireless interface before selecting the most optimal. In some embodiments, the agents can use the local information, e.g., the agent's internal state and the state of its direct neighbor agents, to evaluate the one or more metrics.

The first agent providing SOrg operations can provide self-organizing (e.g., adding or removing agent connections with respect to a partition) and self-configuring operations at the local level using local information to evolve the first agent of the wireless devices into partitions constrained by network related partition properties (e.g., such as diameter and (node) degree limits) isolated at the physical and link layers. The second agent providing SHeal operations can provide self-healing operations (e.g., adding/removing connections between partitions) and self-configuring operations at the local level (e.g., neighboring agents) using local information to concurrently and dynamically interconnect partitions, thereby recovering broad WMN connectivity, while respecting network related partition parameters, such as partition diameter and (node) degree bounds.

Using this physical layer partitioning, the systems, devices and methods of the disclosure can allow increased parallelism of communication flows on different partitions supported by potential frequency diversity. The autonomic properties guaranteed by the combination of the agents can bound the control latency and control workload despite the unconstrained settings (density, scale) of real-world settings. Therefore, each partition can become a control domain of practical multi-domain SDN control planes. Moreover, the systems, devices and methods of the disclosure can provide stable partitioning solutions in time and defined properties.

By using local information for each of the agent's evaluations, the systems, devices, and methods of the disclosure can overcome the deficiencies of previous solutions that relied on centralized algorithms (e.g., limited scalability, weak robustness to changes in topologies, failure of critical elements, etc.). The systems, devices, and methods of the disclosure can therefore manipulate WMN topologies to support increased frequency diversity and advanced network control in realistic, low-cost, low-complexity, and size, density unconstrained WMNs. The systems, devices and methods of the disclosure can thus increase the flexibility and scalability of a wireless network at low cost. For example, the systems, devices, and methods of the disclosure can be capable of evolving a large node placement (a set of geographical positions) of wireless mesh nodes into a network having a topology structure based on a set of inter-connected partitions.

In some embodiments, the systems, devices, and methods of the disclosure can enable low-cost, reliable wireless networks, such as broadband internet services, to be set up in a variety of environments, including those previously deemed unsuitable. For example, these environments may include but are not limited to public spaces, education environments (e.g., college campuses and buildings), large scale events (e.g., festivals, concerts, sporting events, etc.), outdoor resorts/compounds, emerging markets (e.g., developing countries, rural environments, and other environments lacking technological infrastructure), agricultural, constructions, offshore (e.g., oil and gas rigs), shipping ports, mining environments, among others. For example, the systems, devices, and methods of the disclosure can improve broadband Internet connections, for example, in an environment of limited connectivity to broadband Internet infrastructure.

Figure 2:
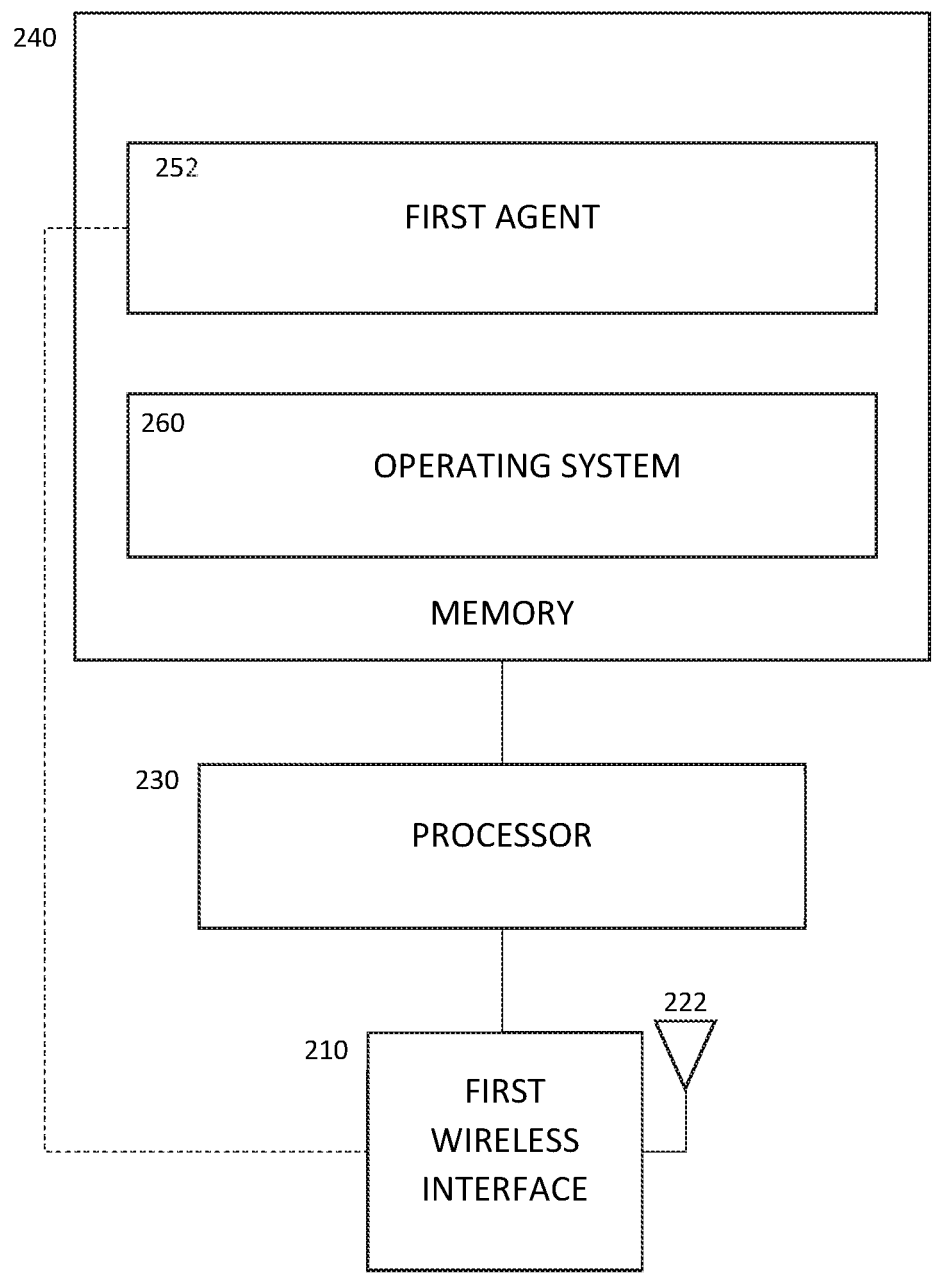
FIG. 2 shows an example of a device having a first agent configured to perform SOrg operations according to embodiments.
Figure 3:
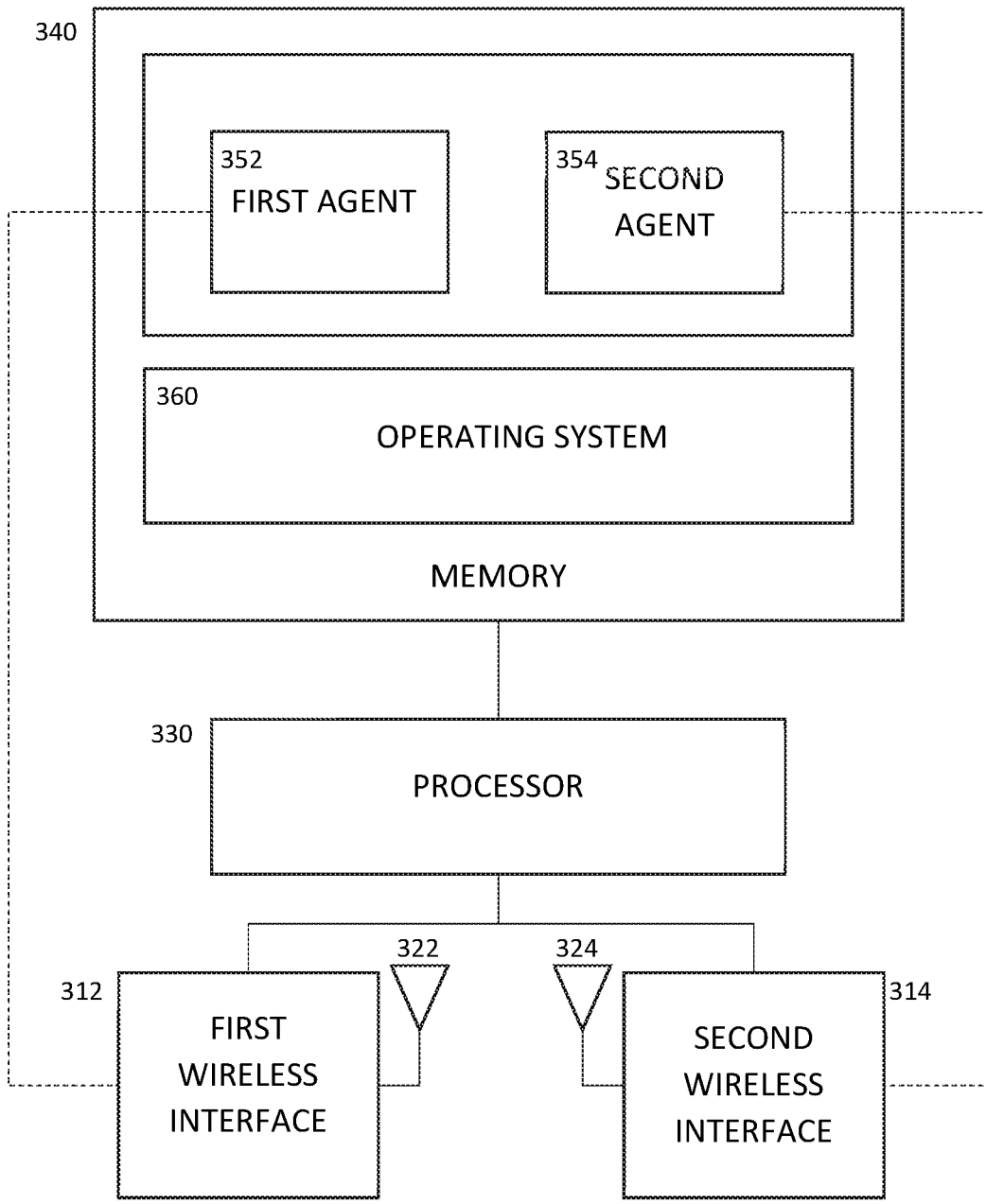
FIG. 3 shows an example of a device having a first agent configured to perform SOrg operations and a second agent configured to perform SHeal operations according to embodiments.

FIGS. 1-3 describe various embodiments implemented in a communication network and with the use of wireless devices having a first wireless interface configured by the first agent to implement the SOrg operations and/or a second wireless interface configured by the second agent to implement SHeal operations. The descriptions of FIGS. 1-3 are not meant to imply physical or architectural limitations to the manner in which different embodiments may be implemented. Different embodiments of the disclosure may be implemented in any suitably-arranged communications system.

FIG. 1 illustrates an example scenario of a wireless network 100 according to embodiments in which devices having the first and/or second agents have evolved into a stable network after several intervals of evaluation processes performed by each agent. The embodiment of the wireless network shown in FIG. 1 is for illustration and explanation purposes only. Other embodiments of the wireless network 100 could be used without departing from the scope of this disclosure.

As shown in FIG. 1, the wireless network 100 may include one or more partitions. In some examples, the agents of partition may be arranged in a mesh topology. In this example, the circles and squares (e.g., 112, 114, 116, 118, 132, 140, 142, 144, 146 and 148) can represent a wireless device, the white triangles (e.g., 112, 114a, 116, 118, 132, 140, 142, 144, 146 and 148a) can represent the first agent/first wireless interface, and the gray-shaded triangle (e.g., 114b and 148b) can represent the second agent/second wireless interface.

In this example, the wireless network 100 can include a first partition 110 of first agents 112, 114a, 116, and 118 of the wireless devices 112, 114, 116 and 118, respectively, and the second agent 128b of the wireless device 128, respectively. In this example, the wireless network 100 may also include a second partition 130 of first agents 132, 140, 142, 144, 146, and 148a of wireless devices 132, 140, 142, 144, 146, and 148, respectively. As shown, the second agent 148b may act to interconnect the first partition 110 and the second partition 130 and the second agent 114b is not connected to any partition.

The term "network device" is used interchangeably herein with the terms "node," "wireless node," "wireless network device," and "wireless device." The term "communication network" used herein generally means a computer network or data network formed of multiple computing devices (e.g. nodes) where data is exchanged between the devices. The communication network may be a mesh network, a wireless network, such as a wireless mesh network or a constrained/low-power wireless network.

Within the partitions, the agents (e.g., nodes) may be arranged in any suitable topology that is permitted by one or more partition parameters and metrics. For example, one or more agents may be arranged in a mesh topology within each partition, such that each agent is connected to more than one other node agent. Each agent may function as a router which can relay messages/data to other nodes in the network. Each agent may be configured to use broadcasting or multicasting communication techniques to transmit messages to neighboring nodes via the respective wireless interface.

The partitions of one or more agents of the one or more wireless device may be formed at the physical and link layers. This way, orthogonal frequency may be used on different partitions. At the link layer, each partition may have a unique network ID (e.g., SSID and BSSID Basic Service Set ID in IEEE 802.11). The use of different network IDs at the link layer for each partition can create logical isolation to provide robustness to the case of equal frequency in neighboring partitions.

In some embodiments, each partition may include only one agent designated as the origin node or agent (also referred to as "origin"). The origin may be considered the agent that establishes a partition originally. In some examples, the origin may act as a location for execution of an SDN controller of its respective partition, such as implementing communication protocols for routing packets. In this example, the device/agent 112, represented by a square, may correspond to the origin node of the partition 110; and the device/agent 132, represented by a square, may correspond to the origin node of the partition 130. In some embodiments, any first agent of a wireless device may be designated as the origin of a partition.

The one or more partition parameters can be applied by an evaluating agent to determine one or more operations, such as one or more connectivity parameters (e.g., partition associations) that do not violate the safety and/or liveness properties enforced by the one or more partition parameters.

In some embodiments, the origin of a partition may be responsible for storing one or more partition parameters and sharing the one or more partition parameters and one or more partition attributes with the other agents associated with its partition so that each agent of the partition may include this information along with one or more of the (internal state) agent attributes and/or parameters when sharing the information with neighboring agents via broadcasting messages. The message can be any type of electronic communication sent by agent/wireless devices within a partition and/or communication network, and is used interchangeably herein with the terms "broadcast message", "data" and "data packet".

In some embodiments, the one or more partition parameters may be pre-configured and stored in the memory, such as the non-volatile memory, of each origin. For example, because any wireless device (via the first agent) may be designated as the origin of a partition, each wireless device of a communication network may have one or more partition parameters stored for use if and when the first agent becomes designated the origin of a partition.

In some embodiments, the one or more partition parameters may include one or more parameters that bound safety of the partition. In some embodiments, the one or more parameters that may be configured to bound one or more safety properties may include a first agent interface degree bound, a second agent interface degree bound, and a distance to partition origin bound.

For example, the first agent interface degree bound may be a maximum number of neighbors of the first agent in the partition. The second agent interface degree bound may be a maximum number of neighbors of the second agent in the partition. The distance to partition origin parameter may be a maximum number of hops between an agent and the agent in the origin node in the partition.

In some embodiments, the one or more parameters may include one or liveness parameters that may be configured to bound one or more liveness properties of the partition. The one or more liveness parameters may include one or more parameters that define the type(s) of liveness property to be used by the partition. In some embodiments, the one or more liveness parameters may include partition size and/or signal strength.

In some embodiments, the one or more partition parameters may include one or more partition-defining parameters, for example, designated by the origin node, which may be later shared to the other agents/nodes of the respective partition. In some embodiments, the one or more partition-defining parameters may include a unique identifier for each partition, wireless frequency (channel number), among others, or a combination thereof. For example, the evaluating agent may determine the wireless frequency of its neighbors during the scanning process.

In some embodiments, the one or more partition parameters may include more or less partition parameters.

In some embodiments, the one or more partition attributes may include dynamic information that relates to the state of the partition and may be stored in the memory, such as the volatile memory, of each wireless device of that partition. In some embodiments, the one or more partition attributes may include partition size, which corresponds to the number of agents in the partition.

In some embodiments, the one or more agent parameters may include pre-configured (e.g., static) information that relates to the agent and may be stored in the memory, such as the non-volatile memory, of each respective wireless device. In some embodiments, the one or more agent parameters may include agent type (e.g., first agent implementing SOrg operations and/or second agent implementing SHeal operations).

In some embodiments, the one or more agent attributes may include dynamic information that relates to the state of the agent. In some embodiments, the one or more agent attributes may include agent distance to partition origin, agent interface degree, signal level strength of neighbors of that agent, among others, or a combination thereof.

For example, the agent distance to the partition origin may correspond to the number of hops from the respective agent to the origin. The agent interface degree may correspond to the agent's perception of its number of direct neighbors (e.g., using the broadcast messages received).

In some embodiments, the one or more agent attributes, such as the agent interface distance and the agent interface degree may be stored in memory, such as the volatile memory, of the respective wireless device. In some embodiments, the signal strength may correspond to a signal level that the evaluating agent perceives of its direct neighbors. For example, the evaluating agent may extract that information from the wireless interface physical layer.

In some embodiments, each agent of a wireless network can independently and continuously evaluate and determinate of the one or more agent operations to be implemented by the respective wireless interface. For example, these independent operation decisions, after a number of intervals, can collectively lead to a stable topology/network formation, for example, as shown in FIG. 1.

FIG. 2 shows an example of a network device 200 that includes various components that may be utilized to execute the operations of the SOrg agent (the first agent) according to embodiments. The device 200 may be and/or may be part of an electronic device, a computer, services manager, any device that has wireless capabilities, among others, or any combination thereof.

As shown in FIG. 2, the device 200 may include but is not limited to: a first wireless communication interface (also referred to as "first wireless interface") 210, at least one antenna 222, one or more processors or processing units (later referred to as "processor") 230, and a memory 240, according to some embodiments.

In some embodiments, the processor 230 may include one or more processors or other processing devices that control the overall operation of the wireless device 200. The processor 230 may be capable of executing instructions, programs and other processes resident in the memory 240, including but not limited to first agent 252 and operating system 260. The processor 230 can move data into or out of the memory 240 as required by the executing process.

In some embodiments, the processor 230 may include or be a component of a processing system implemented with one or more processors. The one or more processors may be implemented with any combination of microprocessors, microcontrollers, integrated circuits, among others, or any combination thereof.

The memory 240 may include one or more devices for storing data and/or instructions for the processor 230 and/or one or more interfaces (e.g., the first wireless interface 210). In some embodiments, the memory may include a volatile memory, such as random access memory (RAM), for use as temporary memory, and/or non-volatile memory such as Flash, read only memory (ROM), or electrically erasable programmable ROM (EEPROM), for example, storing data, programs, or instructions.

In some embodiments, the first agent 252 may be stored in the memory 240 by way of example, and not limitation, as well as the operating system 260, one or more application programs, other program modules and program data. In some embodiments, the first agent 252 may carry out the functions and/or methodologies related to the one or more operations as described herein. As described herein, the first agent 252 may be configured to determine one or more operations performed by the first wireless interface 210 based on one or more metrics determined from the local information received from the neighboring agents.

In some embodiments, the first agent 252 may be a program product having one or more of program modules that are configured to carry out the functions of embodiments of the disclosure. In some examples, the first agent 252 may be incorporated into the operating system 260. In some examples, the first agent may be incorporated into the firmware of the wireless device 200.

The memory 240 may be configured to store (temporarily and/or permanently) messages that are received by the first wireless interface 210 from other agents within the communication network. For example, the memory 240 may store the latest local information received from a neighboring agent, or may store the latest broadcast message(s) that the first wireless interface 210 has received from neighboring agent(s). The memory 240 may be configured to delete/erase any older (less up-to-date) messages stored, after the latest message has been received and stored and/or after each evaluation.

By way of example, the first wireless interface 210 can transmit messages to, and receive messages from neighboring agent(s) within a communication network via the antenna 222 in which the agent is located (such as communication network 100). The wireless interface 210 may be any communication module suitable for sending and receiving messages with an external wireless device. The wireless interface 210 may be configured to use multicasting, broadcasting, or unicasting to forward messages to one or more agents in a communication network. The communication protocol/technique used by the wireless interface 210 may depend on the topology of the communication network.

In some embodiments, the wireless interface 210 may communicate with other agents/devices in the communication network by dividing time into intervals, and sending messages to the other (e.g., neighboring) agents and/or scanning and/or receiving messages from the other agents during each interval. Each interval may be, by default, the same length T. In embodiments, the timing of the start (e.g., initiation of evaluation interval) of the interval T may be determined, specified or controlled by the agent of the device 200 (e.g., first agent 252).

The first agent 252 may also control the one or more operations performed by the wireless interface 210. For example, the first agent 252 may determine and instruct (e.g., configure) the wireless interface 210 with respect to one or more operations (also referred to as "one or more agent operations"), for example, determined during the evaluation process (e.g., see FIGS. 4 and 5). The one or more operations may include one or more connectivity operations (e.g., association with (e.g., maintaining, joining, leaving, and/or creating) a partition), one or more timing operations (e.g., time interval at which the interface scans for messages from neighbor agents for the connectivity operation evaluation process), among others, or a combination thereof.

Although FIG. 2 illustrates one example of a wireless device having the first agent, various changes may be made to FIG. 2. For example, various components in FIG. 2 could be combined, further subdivided, or omitted and additional components could be added according to particular need. By way of an example, the wireless device 200 may include one or more additional communication interfaces configured to communication to one or more communication network systems including but, not limited to wired networks and/or wireless networks. For example, the networks may include but is not limited to Bluetooth network, a cellular network, a universal serial bus (USB) network, a network based on the standards described in IEEE 802.11 (e.g., a Wi-Fi network), an Ethernet network, another network, among others, or a combination thereof.

FIG. 3 shows an example of a network device 300 that includes various components that may be utilized to execute the operations of the SHeal agent (the second agent) in addition to the various components that may be utilized to execute the operations of the SOrg agent (the first agent) according to embodiments. The device 300 may be and/or may be part of an electronic device, a computer, services manager, any device that has wireless capabilities, among others, or any combination thereof.

Like the device 200 shown in FIG. 2, the device 300 may include but is not limited to: a first wireless communication interface (also referred to as "first wireless interface") 312, at least one antenna 322, one or more processors or processing units (later referred to as "processor") 330, and a memory 340, according to some embodiments. Like the device 200, the device 300 may have the SOrg agent configuration, a first agent 352 and the first wireless interface 312 as described with respect to FIG. 2. In addition, the device 300 may further include a second agent 354 that is configured to control a second wireless interface 314, and a second antenna 324.

In some embodiments, like the device 200 shown in FIG. 2, the processor 330 may include one or more processors or other processing devices that control the overall operation of the wireless device 300. The processor 330 may be capable of executing instructions, programs and other processes resident in the memory 340, including but not limited to the first agent 352, the second agent 354, and an operating system 360. The processor 330 can move data into or out of the memory 340 as required by the executing process.

In some embodiments, the processor 330 may include or be a component of a processing system implemented with one or more processors. The one or more processors may be implemented with any combination of microprocessors, microcontrollers, integrated circuits, among others, or any combination thereof.

The memory 340 may include one or more devices for storing data and/or instructions for the processor 330 and/or one or more interfaces (e.g., 312 and/or 314). In some embodiments, the memory may include a volatile memory, such as random access memory (RAM), for use as temporary memory, and/or non-volatile memory such as Flash, read only memory (ROM), or electrically erasable programmable ROM (EEPROM), for example, storing data, programs, or instructions.

In some embodiments, the first agent 352 and the second agent 354 may be stored in memory 340 by way of example, and not limitation, as well as the operating system 360, one or more application programs, other program modules and program data. In some embodiments, the first agent 352 and the second agent 354 may independently and concurrently carry out the functions and/or methodologies related to connectivity operations as described herein. As described herein, the first agent 352 may be configured to determine one or more operations performed by the first wireless interface 312 based on one or more metrics determined from the local information received from the neighboring agents; and the second agent 354 may be configured to determine one or more operations performed by the second wireless interface 314 based on one or more metrics determined from the local information received from the neighboring agents.

In some embodiments, the first agent 352 and/or the second agent 354 may be a program product having one or more of program modules that are configured to carry out the functions of embodiments of the disclosure. In some examples, the first agent 352 and/or the second agent 354 may be incorporated into the operating system 360. In some examples, the first agent may be incorporated into the firmware of the wireless device 300.

The memory 340 may be configured to store (temporarily and/or permanently) messages that are received by the first wireless interface 312 and/or the second wireless interface 314 from other agents within the communication network. For example, the memory 340 may store the latest local information received from a neighboring agent, or may store the latest broadcast message(s) that the first wireless interface 312 and/or the second wireless interface 314 has received from neighboring agent(s). The memory 340 may be configured to delete/erase any older (less up-to-date) messages stored, after the latest message has been received and stored and/or after each evaluation.

By way of example, each of the first wireless interface 312 and/or the second wireless interface 314 can transmit messages to and receive messages from neighboring agents within a communication network via the antenna 322 and the antenna 324, respectively, in which the agents is located (such as communication network 100). Like FIG. 2, the first wireless interface 312 and/or the second wireless interface 314 may be any communication module suitable for sending and receiving messages with an external wireless device. The first wireless interface 312 and/or the second wireless interface 314 may be configured to use multicasting, broadcasting, or unicasting to forward messages to one or more agents in a communication network. The communication protocol/technique used by the first wireless interface 312 and/or the second wireless interface 314 may depend on the topology of the communication network.

In some embodiments, each of the first wireless interface 312 and/or the second wireless interface 314 may independently and/or concurrently communicate with other agents/devices in the communication network by dividing time into intervals, and sending messages to the other (e.g., neighboring) agents and/or scanning and/or receiving messages from the other agents during each interval. Each interval may be, by default, the same length T. In some embodiments, the timing of the start (e.g., initiation of evaluation interval) of the interval T may be determined, specified or controlled by the agent of the device 300 (e.g., the first agent 352 and/or the second agent 354).

Each of the first agent 352 and the second agent 354 may also control the one or more operations performed by the first wireless interface 312 and the second wireless interface 314, respectively. For example, each of the first agent 352 and the second agent 354 may determine and instruct (e.g., configure) the respective wireless interface 312 and 314 with respect to one or more operations (also referred to as "one or more agent operations"), for example, determined during the respective evaluation process (e.g., see FIGS. 4-6). The one or more operations may include one or more connectivity operations (e.g., association with (e.g., maintaining, joining, leaving, and/or creating) a partition), one or more timing operations (e.g., time interval at which the interface scans for messages from neighbor agents for the connectivity operation evaluation process), among others, or a combination thereof.

Like FIG. 2, though FIG. 3 illustrates one example of a wireless device having the first agent and the second agent, various changes may be made to FIG. 3. For example, various components in FIG. 3 could be combined, further subdivided, or omitted and additional components could be added according to particular need. For example, the wireless device 300 may include one or more additional communication interfaces configured to communication to one or more communication network systems including but, including but not limited to wired networks and/or wireless networks. For example, the networks may include but is not limited to Bluetooth network, a cellular network, a universal serial bus (USB) network, a network based on the standards described in IEEE 802.11 (e.g., a Wi-Fi network), an Ethernet network, another network, among others, or a combination thereof.

Figure 4:
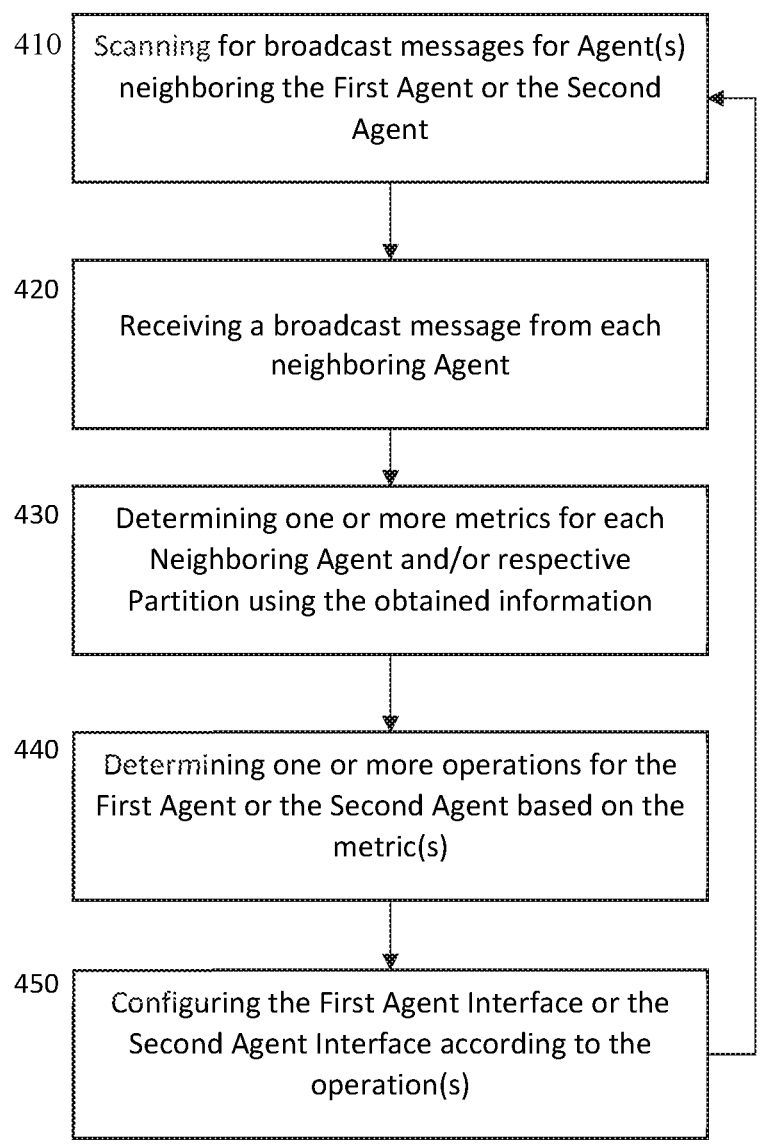
FIG. 4 shows a method for determining one or more operations using local information with respect to an evaluating agent, according to embodiments.

FIG. 4 shows a method 400 for determining one or more operations using local information that is performed by one of the agents (also referred to as "evaluating agent") of a wireless device using local information at a designated time interval (e.g., one epoch). Each agent of a wireless device may periodically perform this method (also referred to as "evaluation cycle") at a designated time interval (T)(e.g., as indicated in the one or more operations of the evaluating agent). This way, each evaluating agent can continuously evaluate its partition association so as to encourage convergence to the defined properties of partitions.

The methods described herein may be implemented in hardware, software (e.g., firmware) or a combination thereof. All, or a portion of, the embodiments described by the flowchart illustrated in FIG. 4 can be implemented using the agent-defined computer-readable and computer-executable instructions which reside, for example, in a memory or a computer readable medium of the controller of the respective wireless device. As previously discussed, the method 400 may be concurrently and/or independently implemented by each agent of each node to evaluate one or more operations (e.g., partition association, timing of evaluation process, etc.) for that agent.

In some embodiments, the method 400 may include a step 410 of scanning for any broadcast messages from nearby agents. For example, each evaluating agent may configure the respective wireless interface to scan broadcast messages from agents that are direct neighbors of the evaluating agent.

Agents that are direct neighbors may be considered to be in communication range with the evaluating agent.

In some embodiments, the step 410 may include scanning each frequency of the wireless network, one at a time. In some embodiments, the frequency on which the scanning may be initiated may depend on whether the evaluating agent that implemented the method is associated with a partition. For example, if the evaluating agent is not a member of/associated with a partition, the evaluating agent can scan the sequences from lowest to highest frequency, one at a time. If the evaluating agent is a member of/associated with a partition, the evaluating agent can first scan the partition frequency first and then scan the remaining frequencies in a sequence from the lowest to the highest.

In some embodiments, the method 400 may include a step 420 of receiving a broadcast message for each agent that is in communication range of the evaluating agent. In some examples, the evaluating agent may receive a broadcast message from each direct neighbor (e.g., a single hop away).

In some embodiments, the broadcast message from each of the agents can include information regarding a state of each (neighbor) agent, a state of each partition that includes an agent, among others or a combination thereof. As discussed above, the information (also referred to as "local information") may include one or more partition parameters, one or more partition attributes, one or more agent attributes, or a combination thereof. The one or more partition parameters may include the first agent interface degree bound (dgb) (e.g., a maximum number of neighbors of a first agent in a partition); the second agent interface degree bound (dghb) (e.g., a maximum number of neighbors of a second agent in a partition); the distance to partition origin parameter (hb) (e.g., maximum number of hops of the shortest path between an agent and the agent in the origin node in the partition); one or more liveness parameters (lvh) (e.g., partition size and/or signal strength); one or more partition-defining parameters (e.g., partition identifier and/or wireless frequency—channel number); among others; or any combination thereof. The one or more partition attributes may include partition size (e.g., the number of agents in the partition). The one or more agent parameters may include agent type (e.g., first agent implementing SOrg operations and/or second agent implementing SHeal operations). The one or more agent attributes may include the agent distance to the partition origin (e.g., the number of hops of the shortest path from the respective agent to the origin); the agent interface degree (dg for first agent and dgh for second agent) (e.g., the agent's perception of its number of direct neighbors (e.g., using the number of broadcast messages received)); the signal strength (e.g., a signal level that the evaluating agent perceives of its direct neighbors); among others; or any combination thereof.

Next, the method 400 may include a step 430 of determining one or more metrics for each neighboring agent and/or respective partition (also referred to as "agent candidate" and (respective) "partition candidate") based on an agent type (e.g., first agent or second agent) of the evaluating agent. The one or more metrics can relate to evaluating a partition candidate (e.g., possible connectivity to a partition) with respect to validity and/or quality. The one or more metrics may include one or more validity metrics, one or more quality metrics, among others, or any combination thereof. For example, the step 430 may first evaluate the one or more metrics related to validity to remove (nearby) invalid partition candidates before evaluating the quality of the remaining partitions to determine a partition association for the evaluating agent.

In some embodiments, the one or more metrics for each agent relating to validity (also referred to as "one or more validity metrics") may include a distance metric, a degree metric, among others, or a combination thereof. In some embodiments, the one or more metrics relating to quality (also referred to as "one or more quality metrics") may include one or more liveness parameters.

By way of example, the distance metric may be determined using the distance to partition origin bound attribute (hb) and agent distance to the partition origin attribute (h). The degree metric may be determined using the respective interface degree bound parameter (dgb or dghb).

By way of example, a partition candidate (i.e., a nearby partition) may be considered to be valid if it has 1) at least one agent at communication reach of the evaluating agent; 2) all agents satisfy (i.e., do not violate) safety properties (e.g., distance and degree metrics); and 3) all agents will satisfy the safety properties after the addition of the evaluating agent.

After the one or more metrics are determined, the method 400 may further include a step 440 of determining one or more agent operations for the evaluating agent (e.g., evaluating first agent or evaluating second agent) using the one or more metrics based on the agent type. For example, the one or more operations may include one or more connectivity operations related to the association of the evaluating agent with a partition (e.g., maintaining, joining, leaving, and/or creating); and/or one or more timing operations related to the timing of the next evaluation (e.g., interval t). For example, the step 440 may determine to add a random delay to the start of the next evaluation if it is determined that the evaluating agent should leave its current partition because it is either invalid or insufficient quality based on the one or more validity and quality metrics. This random delay can optimize convergence towards a stable network, for example, by reducing the effort to convergence regarding the number of partition changes.

Next, the method 400 may include a step 450 of configuring the evaluating agent's interface (e.g., the first wireless interface or the second wireless interface) according to the one or more operations determined in step 440.

Figure 5:
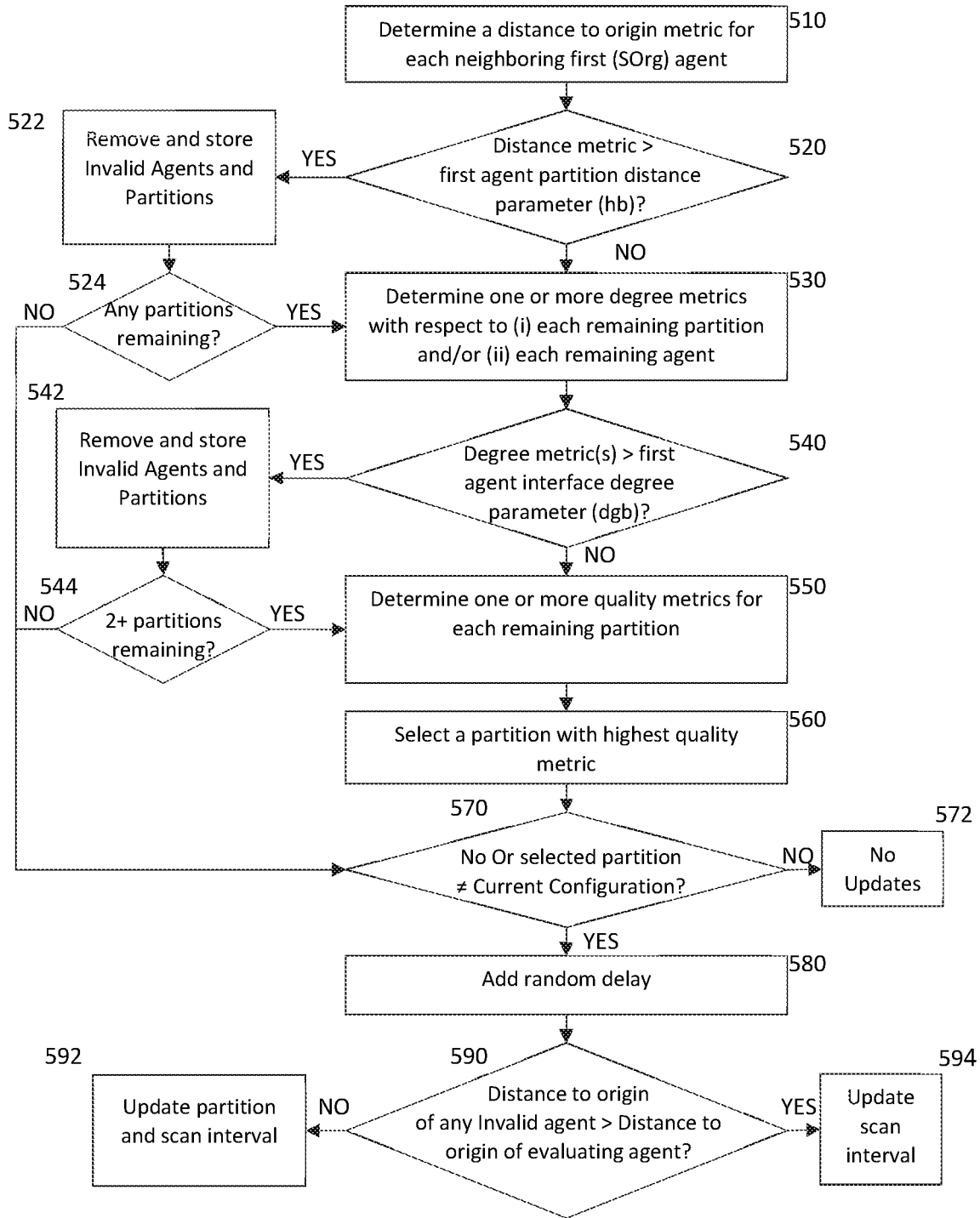
FIG. 5 shows an example of determining one or more operations using local information with respect to a SOrg evaluating agent according to embodiments.

FIG. 5 shows a method 500 of processing that a first (SOrg) agent (type) of a wireless device implements to determine the one or more metrics determined in steps 430 and the one or more operations step 440 of FIG. 4. The goal of the method 500 is to provide a balanced network partitioning (e.g., partitions of similar sizes), as well as enforcing diameter and node degree bounds.

In some embodiments, the method 500 may include a step 510 of determining a distance metric for each neighboring first agent/interface (also referred to as "agent candidate") of the evaluating first agent (also referred to as "evaluating agent"). For example, the evaluating agent may use the local information to determine the distance metric. The evaluating agent may determine the distance metric for each first agent candidate by adding a hop to the respective agent distance to the partition origin attribute for that agent (provided in the local information). The distance metric determined for each agent candidate may be a distance to origin metric. In some embodiments, the distance metric determined for each metric may correspond to the (future) distance (e.g., number of hops) between the evaluating agent if connected to that agent candidate/interface and the origin of its respective partition attribute of that agent candidate.

Next, the method 500 may include a step 520 of comparing the distance metric for each neighboring first agent/interface with its respective distance to origin parameter (hb). If the evaluating agent determines that the distance metric (e.g., the future distance) for a partition candidate given each neighboring first agent/interface is greater than that partition candidate's distance to origin parameter (hb) (YES at step 520), the agent can determine at step 520 that the agent/partition candidate is invalid and then can proceed to step 522 to remove that agent/partition candidate as an invalid option from the list of partition candidates (e.g., removes as possible partition connection) for the evaluating agent and temporarily store the invalid partition information.

After the step 520 is performed for each partition candidate and at least one partition candidate was deemed invalid (YES at step 520 and removed at step 522), the method 500 may include a step 524 of determining whether there are any candidate options remaining. If there are no partition candidates remaining (NO at step 524), the evaluating agent then can proceed to step 570 (discussed below) to determine whether this evaluation will result in a change of configuration of the evaluating agent (e.g., change partition association). If there are no invalid partition candidates (NO for each partition candidate at step 520), then steps 522 and 524 can be omitted.

If there are remaining partition candidates (YES at step 524; at least one NO at step 520), the evaluating agent may proceed to step 530 of determining one or more degree metrics of each remaining (valid) partition candidate. In some examples, the evaluating agent may determine a first degree metric (the agent's future degree based on joining the partition candidate) for each partition candidate and/or a second degree metric for each neighboring agent (agent candidate) of each partition candidate (the neighbors' degree if the evaluating agent joins the partition candidate).

In some embodiments, for the first degree metric, the evaluating agent may determine its future interface degree for a partition candidate based on the number of future first agent neighbors it identifies at that partition candidate. For example, the evaluating agent can account this number of first agent neighbors based on the number of messages received from different first agent neighbors at the same partition.

In some embodiments, for the second degree metric, the evaluating agent may use one of the respective neighboring first agent's attributes provided with the local information, i.e., the agent interface degree, to determine the second degree metric for each neighboring agent for that partition candidate. For example, for the second degree metric, the evaluating agent may increase the neighboring first agents' interface degree for that partition candidate 1 (+1) to determine the second degree metric for each agent candidate of that partition.

Next, the evaluating agent may individually compare, for each (remaining) partition candidate, its first metric (its future interface degree on the partition candidate) and the second metric (the future interface degree of all its future neighbors in the partition candidate) to the first interface degree bound parameter (dgb) of the respective partition candidate (step 540). If the evaluating agent determines that at least one of the degree metrics for a partition is greater than the interface degree bound (dgb) (YES at step 540), the evaluating agent can determine at step 540 that the partition candidate is invalid and then can proceed to step 542 to remove that partition and associated agents as an invalid option from the list of partition candidates for the evaluating agent and temporarily store the invalid partition information.

After the step 540 is performed for each partition candidate and at least one partition candidate was deemed invalid (YES at step 540 and removed at step 542), the method 500 may include a step 544 of determining whether there are any partition candidates remaining. If there are no partition candidates remaining (NO at step 544), the evaluating agent then can proceed to step 570 (discussed below) to determine whether this evaluation will result in a change of configuration of the evaluating agent (e.g., change partition association). If there are no invalid partition candidates (all NO to step 540), then steps 542 and 544 can be omitted.

If there are 2 or more remaining partition candidates (YES at step 544; at least one NO at step 540), the evaluating agent may determine the quality of the valid partition candidates (e.g., the remaining partition candidates). If there is only one remaining partition candidate or no valid partition candidates (NO at step 544), steps 550 and 560 may be skipped and the method may directly proceed to step 570.

In some embodiments, the evaluating agent may include a step 550 of determining the one or more quality metrics for each partition candidate using the liveness parameter provided in the local information. In some embodiments, the evaluating agent may list the partition size attributes for each partition from highest to lowest.

Next, the evaluating agent may select the partition candidate that has the highest partition size in step 560 as the partition candidate to which the evaluating agent could associate.

Before the evaluating agent configures its first wireless interface to join that partition, the evaluating agent may compare the partition association decision (e.g., a selected partition candidate (in step 560) or no partition candidate (in step 544)) to its current partition association (internal state) in step 570 to determine whether the connectivity operation(s) should be changed to the partition association decision.

If the evaluating agent determines that the partition association will remain the same (e.g., partition association decision is the same as the current partition association) (NO at step 570), the evaluating agent can end the evaluation process for this epoch without any updates to the one or more agent operations (e.g., the partition association and interval timing at the initiation of method 500) at step 572. The evaluating agent may continue to use the one or more agent operations (e.g., the partition association and interval timing at the initiation of method 600) to configure the second wireless interface device.

If the evaluating agent determines that the partition association decision is different from the current partition association state (YES at step 570), the evaluating agent may update the operation(s) to enforce convergence and reduce the effort to convergence regarding the number of partition changes, and changing the concurrency set of the evaluating agent by introducing random delays to the start of the next evaluation cycle.

For example, the evaluating agent may include a step 580 of changing the timing operation by adding a random delay to the interval for the next evaluation cycle. For example, the evaluating agent in step 580 may include determining the one or more timing operations of the first wireless interface so that it includes a random delay to the interval for the next evaluation cycle.

Next, the method may further include a step 590 to evaluate its relative distance to origin amongst its neighbors on its current partition. In step 590, the evaluating agent may use its neighboring agents deemed invalid in steps 520 and 540 to determine whether the distance to the origin of any invalid agent is greater than the distance to the origin of the evaluating agent. This way, the first agent can enforce a partial ordering in which agents closer to the border of the partition can act earlier to solve possible violations of the safety properties enforced by the agents of disclosure.

In some embodiments, if the evaluating agent determines that, amongst its neighbors in an invalid state at its current partition (identified in steps 520 and 540), the evaluating agent may be the agent closest to the border of its partition (YES at step 590). The evaluating agent may then proceed to update: (i) the one or more connectivity operations so that the partition association of the evaluating agent is updated to either none (e.g., leaving the current partition to create a new partition in which the evaluating agent also becomes the origin node) or joining a new partition and (ii) the one or more timing operations so that the timing of the next interval of the evaluating process to be performed by the evaluating agent is changed to incorporate the random delay (step 580) in step 592. The evaluating agent may then use the determined one or more agent operations (determined in step 592) to configure the respective first wireless interface (step 450).

In some embodiments, if the evaluating agent determines that, amongst its neighbors in invalid state at its current partition, the evaluating agent is not closest to the border of its current partition (NO at step 590), then the evaluating agent may not change the current partition association (e.g., state). In step 594, the evaluating agent may determine that the one or more agent operations may include the current, connectivity operation(s) (e.g., partition association at start of the method 500) as the one or more connectivity operations and the (updated) one or more timing operations.

In some embodiments, the evaluating first agent may then use the determined one or more agent operations (determined in steps 572, 592 or 594) to configure the respective first wireless interface (step 450).

Because the first agents (SOrgs) do not consider the second agents to determine valid nearby partitions, the second agents can become a secondary agent type that reacts to the changes induced by the first agent.

Figure 6:
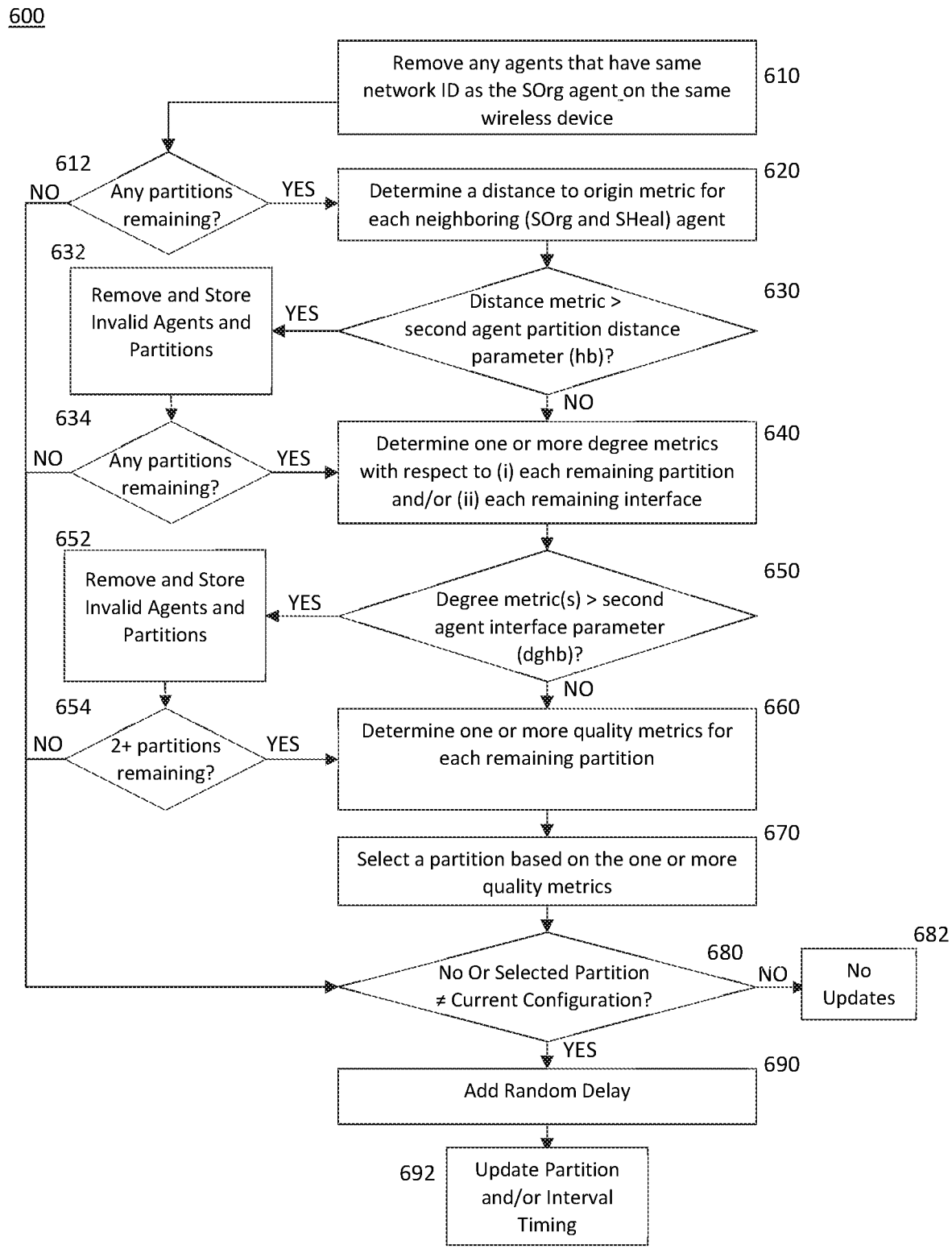
FIG. 6 shows an example of determining one or more operations using local information with respect to a SHeal evaluating agent according to embodiments.

FIG. 6 shows a method 600 of the processing that a second (SHeal) agent of a wireless device (e.g., agent 114b, 148b) implements to determine the one or more metrics in step 430 and the one or more connectivity operations determined in step 440 of FIG. 4. The SHeal agent can similarly determine the validity of partition candidates before determining the quality of the candidates like the SOrg agent. The goal of the method 600 is to interconnect partitions in order to recover maximum possible global connectivity while respecting the bounds on partition diameter and node degree.

In some embodiments, the method 600 may include a step 610 of removing any neighboring first and second agent(s)/interface(s) (agent candidates) that are of the same partition of the evaluating second agent's (also referred to as "evaluating agent") first agent counterpart. For example, the step 610 may include removing any first and second agents(s)/interface(s) that have the same network id as the first agent (SOrg agent) of the wireless device that includes the evaluating second agent (SHeal agent). For example, if the second agent 148b was evaluating partition candidates, it would remove all agents/interfaces that has the same network id as its counterpart first agent 148a. By way of example, by the evaluating agent considering agent candidates that are of a different partition of its counterpart first agent, the method 600 can induce increased inter-partition connectivity.

Next, the method 600 may include a step 612 of determining whether there are any candidate options remaining. If there are no partition candidates remaining (NO at step 612), the evaluating agent then can proceed to step 680 (discussed below) to determine whether this evaluation will result in a change of configuration of the evaluating agent (e.g., change partition association).

In some embodiments, if there are remaining partition candidates (YES at step 612), the method 600 may continue to step 620 of determining a distance metric for each remaining, neighboring agent/interface (agent candidates) of the evaluating second agent. For example, the evaluating second agent may use the local information to determine the distance metric. The evaluating second agent may determine the distance metric for each first agent candidate by adding a hop to the respective agent distance to the partition origin attribute for that agent (provided in the local information). The distance metric determined for each agent candidate may be a distance to origin metric. In some embodiments, the distance metric determined for each first agent candidate may correspond to the (future) distance (e.g., number of hopes) between the evaluating agent if connected to that agent candidate/interface and the origin of its respective partition attribute of that agent candidate.

Next, the method 600 may include a step 630 of comparing the distance metric for each neighboring agent/interface with the respective distance to origin parameter (hb). If the evaluating agent determines that the distance metric (e.g., the future distance) for a partition candidate given metric determined for each neighboring agent/interface is greater than that partition candidate's distance to origin parameter (hb) (YES at step 630), the agent can determine at step 630 that the agent candidate is invalid as an entry point to its respective partition and then can proceed to step 632 to remove that agent candidate as an invalid option from the list of partition candidates (e.g., removes as possible partition connection) for the evaluating agent and temporarily store the invalid agent and partition information. If all agent candidates of a given partition are invalid, the partition may be considered to be invalid.

After the step 630 is performed for each agent/partition candidate and at least one partition candidate was deemed invalid (YES at step 630 and removed at step 632), the method 600 may include a step 634 of determining whether there are any partition candidate options remaining. If there are no partition candidates remaining (NO at step 634), the evaluating agent then can proceed to step 680 (discussed below) to determine whether this evaluation will result in a change of configuration of the evaluating agent (e.g., change partition association). If there are no invalid partition candidates (all NO to step 630), then steps 632 and 634 can be omitted.

If there are remaining partition candidates (YES at step 634; at least one NO at step 630), the evaluating agent may proceed to step 640 of determining one or more degree metrics of each remaining (valid) partition candidate. In some examples, the evaluating agent may determine a first degree metric (the agent's future degree based on joining the partition candidate) for each partition candidate and/or a second degree metric for each neighboring agent (agent candidate) of each partition candidate (the neighbors' degree if the evaluating agent joins the partition candidate).

In some embodiments, for the first degree metric, the evaluating agent may determine its future interface degree for a partition candidate based on the number of future first and second interface agent neighbors it identifies at the partition candidate. For example, the evaluating agent can account this number of first and second interface agent neighbors based on the number of messages received from different first and second interface agent neighbors at the same partition.

In some embodiments, for the second degree metric, the evaluating agent may use one of the respective neighboring first and second interface agent's attributes provided with the local information, agent interface degree, to determine the second degree metric for each neighboring agent for that partition candidate. For example, for the second degree metric, the evaluating agent may increase the respective partition candidates neighboring first and second interface agents' interface degree by 1 (+1) to determine the second degree metric for each agent candidate of that partition.

Next, the evaluating agent may individually compare the first and second metrics of each partition candidate to the second agent interface degree bound parameter (dghb) of each respective partition candidate (step 650). If the evaluating agent determines that at least one of the degree metrics for a partition is greater than the partition's second agent interface degree bound (dghb) (YES), the evaluating agent can determine at step 650 that the partition candidate is invalid and then can proceed to step 652 to remove that partition and associated agents as an invalid option from the list of partition candidates for the evaluating agent and temporarily store the invalid partition information.

Next, after the step 650 is performed for each partition candidate and at least one partition candidate was deemed invalid (YES at step 650 and removed at step 652), the method 600 may include a step 654 of determining whether there are any partition candidates remaining. If there are no partition candidates remaining (NO at step 654), the evaluating agent then can proceed to step 680 (discussed below) to determine whether this evaluation will result in a change of configuration of the evaluating agent (e.g., change partition association).

If there are 2 or more remaining partition candidates (YES at step 654; at least one NO at step 650), the evaluating agent may determine the quality of the valid candidates (e.g., the remaining partition candidates). If there is only one remaining partition candidate, steps 660 and 670 may be skipped and the method may directly proceed to step 680.

In some embodiments, the evaluating agent may include a step 660 of determining the one or more quality metrics for each partition candidate using at least the liveness type parameter provided in the local information. In some embodiments, the evaluating agent may use the partition size attributes and/or signal strength for each partition from highest to lowest.

Next the evaluating agent may select the partition candidate that has the highest partition size or signal strength in step 670 as the partition candidate decision to which the evaluating agent may associate.

Before the evaluating agent configures the second wireless interface to that partition, the evaluating agent can compare the partition association decision (e.g., a selected partition candidate (in step 670) or no partition candidate (in step 654)) to its current partition association in step 680 to determine whether the connectivity operation(s) should be changed to the partition association decision.

If the evaluating agent determines that the partition association will remain the same (e.g., partition association decision is the same as the current partition association) (NO at step 680), the evaluating agent can end the evaluation process for this epoch without any updates (step 682). The evaluating agent may continue to use the one or more agent operations (e.g., the partition association and interval timing at the initiation of method 600) to configure the second wireless interface device.

In another example, if the evaluating agent determines that the partition candidate decision has the same network identification (NO at step 680), the evaluating agent can end its evaluation process with respect to partition membership without any updates (step 682). The evaluating agent can continue to use the one or more agent operations (e.g., the partition association and interval timing at the initiation of method 600).

If the evaluating agent determines that the partition candidate decision is different from the current state and current partition (YES at step 680), the evaluating agent may include a step 690 of adding a random delay to the one or more timing operations by introducing random delays to the start of the next evaluation cycle. For example, the evaluating agent may include a step 692 to update (i) the one or more connectivity operations so that the partition association of the evaluating agent is updated to either none (e.g., the second agent has no association to a partition) or joining a new partition and (ii) the one or more timing operations so that the timing of the next interval of the evaluating process to be performed by the second evaluating agent is changed to incorporate the random delay In some embodiments, the evaluating agent may then use the determined one or more agent operations (determined in steps 682 or 692) to configure the respective second wireless interface (step 450).

Figure 7:
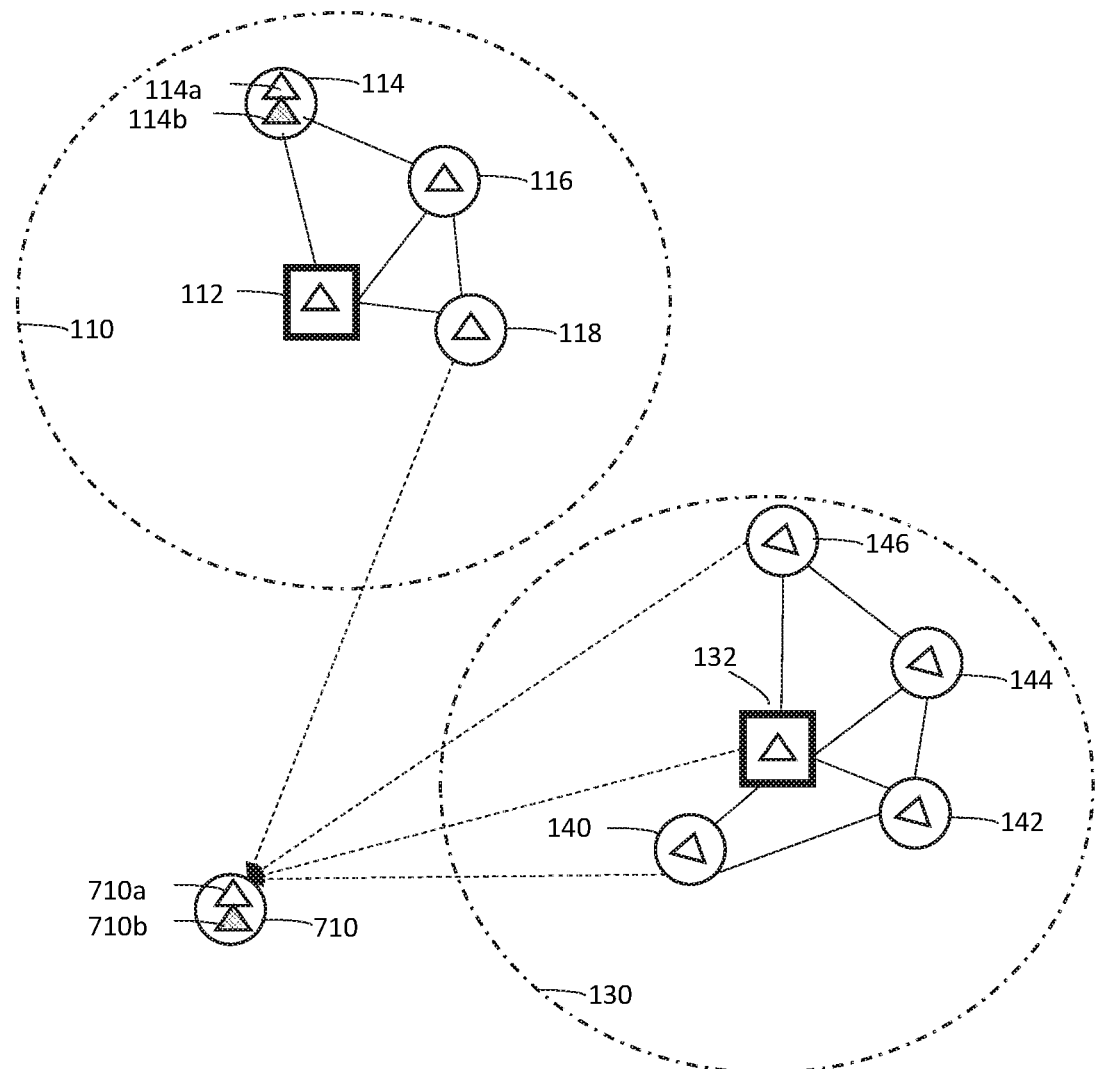
FIG. 7 shows an example of evaluation of operations described in FIGS. 4-6 with respect to a wireless device, according to embodiments.

FIG. 7 illustrates an example scenario of a wireless network 700 according to embodiments before the first and/or second agents have evolved into a stable network shown in FIG. 1. In this example, wireless device 710 having a first agent 710a and a second agent 710b is added to the network perceiving the first partition 110 and the second partition 130.

In this example, the first partition 110 has the following partition parameters: a first agent interface degree bound of 5 (dgb); a second agent interface degree bound of 6 (dghb); a distance to origin of 2 (hb); a unique network identifier; and a liveness parameter set to partition size. The second partition 130 has the following parameters: a first agent interface degree bound of 6 (dgb); a second agent interface degree bound of 6 (dghb); a distance to origin of 2 (hb); a unique network identifier; and a liveness parameter set to partition size.

In this example, the first agent 710a is assumed to be activated first to perform the evaluation process described with respect to FIGS. 4 and 5. However, it will be understood that the first agent 710a and the second agent 710b may be performed in a different order, partially concurrently (overlapped) or fully concurrently.

In this example, the first agent 710a can scan for broadcast messages and receive messages from four neighboring nodes, the first agent of the wireless device 118 of the partition 110 and the first agent of the wireless devices 132, 140, 146 of the partition 130. Each of these messages can provide the local information from each respective agent. The local information may include the one or more partition parameters along with the one or more partition attributes, one or more agent types, and one or more agent attributes.

In this example, the first agent of the wireless device 118 can provide via the message received by the agent 710a, the one or more partition parameters for the partition 110; the agent type parameter as first agent; the one or partition attributes including the partition size (4 nodes); and the one or more agent attributes including the agent distance to the partition origin attribute: 1 hop to the origin 112, and the agent interface degree, dg, which is 2.

The first agent of the wireless device 132 can provide via the message received by the agent 710a, the one or more partition parameters for the partition 130; the agent type parameter as first agent; the one or partition attributes including the partition size (5 nodes); and the one or more agent attributes including the agent distance to the partition origin attribute: 0 hop to the origin 132, and the agent interface degree, dg, which is 4.

The first agent of the wireless device 140 can provide via the message received by the agent 710a, the one or more partition parameters for the partition 130; the agent type parameter as first agent; the one or partition attributes including the partition size (5 nodes); and the one or more agent attributes including the agent distance to the partition origin attribute: 1 hop to the origin 132, and the agent interface degree, dg, which is 2.

The first agent of the wireless device 146 can provide via the message received by the agent 710a, the one or more partition parameters for the partition 130; the agent type parameter as first agent; the one or partition attributes including the partition size (5 nodes); and the one or more agent attributes including the agent distance to the partition origin attribute: 1 hop to the origin 132, and the agent interface degree, dg, which is 2.

Next, the agent 710a may determine the distance metric for each agent. In this example, the distance metric for the first agent of the device 118 would be 2, the distance metric for the agent 132 would be 1, the distance metric for the first agent of the device 140 would be 2, and the distance metric for the first agent of the device would be 2. Because the agent 710a found a shortest path to origin at most 2 on the partition 110, which is below or at the limit 2 (hb), the partition 110 can be considered a valid partition candidate at this step. Because the agent 710a found a shortest path to origin at most 1 on partition 130, which is below or at the limit 2 (hb), the partition 110 can also be considered a valid partition candidate at this step.

As all partition candidates can be considered to be valid, the evaluating agent 710a may then determine the degree metrics. For the device 710a on the partition 110, the first degree metric would be 1 (single neighbor device 118) and the second degree metric related to the first agent of the device 118 would be 3. All these metrics are below or at the dg limit 5; therefore the partition 110 can remain a valid partition candidate at this step. For the agent 710a regarding the partition 130, the first degree metric would be 3. The second degree metric related to the agents of the devices 132, 140, and 146 would be 5, 3, and 3, respectively. All these metrics are below or at the dg limit 6; therefore the partition 130 can remain a valid partition candidate at this step.

In this example, both partition candidates are valid so the agent 710a may proceed to determining one or more quality metrics using the liveness parameter. In this example, the quality metric can be based on partition size. The partition size of the partition 110 is 4 and the partition size for the partition 130 is 5. In this example, the agent 710a would select the partition 130 as the highest quality partition.

Because associating with (e.g., joining) the partition 130 would change the configuration of the agent 710a, the agent 710a can determine to change the timing operation of its respective first wireless interface to include a random delay. Additionally, because there is no invalid agent, the agent 710a can also determine that the connectivity operation(s) should be updated by configuring the respective first wireless interface so that the agent 710a joins the partition 130, as shown in FIG. 1. For example, the agent 710a/device 710 corresponds to the agent 148a/device 148.

In this example, the second agent 710b is assumed to be activated at some point after the agent 710a so that the evaluation of the operations of the second agent 710b is at an interval after the first agent 710a joins the partition 130. In this example, the first agent 710a is assumed to be activated first to perform the evaluation process described with respect to FIGS. 4 and 6. However, it will be understood that the first agent 710a and the second agent 710b may be performed in a different order, partially concurrently (overlapped) or fully concurrently.

In this example, the second agent 710b can scan for broadcast messages and receive messages from two neighboring nodes: the first agent of the wireless device 118 of the partition 110 and the first agent of the wireless devices 132, 140, and 146 of the partition 130. Like the process for the first agent 710a, the messages can provide the local information from each agent that includes the one or more partition parameters, along with the one or more partition attributes, one or more agent types, and one or more agent attributes.

As discussed above, the agent of the wireless device 118 can provide via the message received by the agent 710b, the one or more partition parameters for the partition 110; the agent type parameter as the first agent; the one or partition attributes including the partition size (4 nodes); and the one or more agent attributes including the agent distance to the partition origin attribute: 1 hop to the origin 112, and the agent interface degree, dg, which is 2.

The agent of the wireless device 132 can provide via the message received by the agent 710b, the one or more partition parameters for the partition 130; the agent type parameter as first agent; the one or partition attributes including the partition size (5 nodes); and the one or more agent attributes including the agent distance to the partition origin attribute: 0 hop to the origin 132, and the agent interface degree, dg, which is 4.

The agent of the wireless device 140 can provide via the message received by agent 710b, the one or more partition parameters for the partition 130; the agent type parameter as first agent; the one or partition attributes including the partition size (5 nodes); and the one or more agent attributes including the agent distance to the partition origin attribute: 1 hop to the origin 132, and the agent interface degree, dg, which is 2.

The agent of the wireless device 146 can provide via the message received by agent 710b, the one or more partition parameters for the partition 130; the agent type parameter as first agent; the one or partition attributes including the partition size (5 nodes); and the one or more agent attributes including the agent distance to the partition origin attribute: 1 hop to the origin 132, and the agent interface degree, dg, which is 2.

First, the agent 710b may determine that the devices 132, 140, 146 have the same network id as its counterpart first agent 710a, so that the agent 132/partition 130, agent 140/partition 130, and agent 146/partition 130 can be considered an invalid partition candidate, leaving only the partition 110 (through the agent/device 118) as a valid partition candidate at this step.

The agent 710b may then determine the distance metric with respect to the agents of device 118. In this example, the distance metric for device 118 would be 2. Because it is not above hb, the evaluating agent 710b may then determine the degree metrics.

For the device 118, the first degree metric would be 1 and the second degree metric would be 3. In this example, the degree metric for the agent 118/partition 110 is below dghb of 6 and the device 118/the candidate partition 110 may be considered a valid partition candidate to this step. Because there is only one valid partition, the agent 710*b* may skip determining one or more quality metrics using the liveness parameter.

Because joining partition 110 would change the configuration of the agent 710*b*, the agent 710*b* can determine to change the timing operation of respective first wireless interface to include a random delay and determine that the connectivity operation(s) should be updated by configuring the respective second wireless interface so that the agent 710*b* joins the partition 110, for example, as shown in FIG. 1. For example, the agent 710*b*/device 710 corresponds to the agent 148*b*/device 148.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other embodiments, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels, and/or various other storage mediums capable of storing that contain or carry instruction(s) and/or data.

While the disclosure has been described in detail with reference to exemplary embodiments, those skilled in the art will appreciate that various modifications and substitutions may be made thereto without departing from the spirit and scope of the disclosure as set forth in the appended claims. For example, elements and/or features of different exemplary embodiments may be combined with each other and/or substituted for each other within the scope of this disclosure and appended claims.

What is claimed:

1. A method comprising:

scanning frequencies, using a first wireless interface or a second wireless interface of a wireless device, for broadcast messages of one or more other agents of one or more other wireless devices of a communication network disposed within a wireless communication range at a time interval for an evaluating agent of the wireless device;

wherein the evaluating agent is a first agent or a second agent of the wireless device, the first wireless interface is configured by the first agent of the wireless device to control the connectivity of the first agent to a partition of one or more other agents of the one or more other wireless devices and the second wireless interface is configured by the second agent of the wireless device to control the connectivity of the second agent to another partition of the one or more other agents of the one or more other wireless devices;

receiving a broadcast message from each agent of the one or more other agents of each wireless device of the one or more other wireless devices;

wherein the broadcast message from each agent of the one or more other agents provides information regarding a state of each agent of the one or more other wireless devices and/or a state of each partition that includes at least one agent of the one or more other agents of the one or more other wireless devices;

the information including one or more partition parameters, one or more partition attributes, and one or more agent attributes;

the one or more partition parameters for each partition including (i) an agent interface degree bound that is a maximum number of neighbors of the evaluating agent in a partition and (ii) a distance to partition origin parameter that is a maximum number of hops of a shortest path between the evaluating agent and an agent of another wireless device designated as an origin node in the partition;

determining, by the wireless device, one or more metrics for each agent of the one or more other agents and/or for each partition of the one or more other agents using the information with respect to validity and/or a quality of a connection by the first agent or the second agent to each partition based on an agent type of the evaluating agent; and determining, by the wireless device, one or more agent operations to be deployed by the first wireless interface or the second wireless interface of the wireless device with respect to the first agent or the second agent, based on the one or more metrics and the agent type.

2. The method of claim 1, wherein:
each partition has a unique identifier, the unique identifier including a network id.

3. The method of claim 2, wherein:
each partition includes one wireless device designated as the origin node;
each origin node storing the one or more partition parameters and providing the unique identifier of respective partition,
each origin acts as a reference node of each partition; and
each origin node storing one or more parameters for the respective partition.

4. The method of claim 1, wherein the one or more agent operations includes determining one or more connectivity operations and one or more timing operations, the one or more connectivity operations including determining connectivity of the first agent or the second agent to a partition and the one or more timing operations including a time interval for initiating a next evaluation of connectivity by the evaluating agent.

5. The method of claim 4, further comprising:
configuring the first wireless interface by the first agent or the second wireless interface by the second agent according to the one or more agent operations, respectively.

6. The method of claim 1, wherein the wireless device includes the first agent and the second agent.

7. The method of claim 1, wherein the determining the one or more metrics includes:
determining one or more safety metrics of each partition candidate identified in the one or messages received to determine validity of each partition candidate;
determining one or more quality metrics of each partition candidate determined to be valid based on the one or more safety metrics; and
selecting a partition candidate using the one or more quality metrics.

8. The method of claim 7, wherein the agent interface degree bound includes a first agent interface degree bound that is a maximum number of neighbors of a first agent in partition, and a second agent interface degree bound that is a maximum number of neighbors of a second agent in the respective partition.

9. The method of claim 8, wherein the one or more agent attributes for each agent includes an agent distance to partition origin attribute that is a distance of an agent to the origin node of the respective partition; and an agent interface degree attribute that is a number of neighbors of the agent.

10. The method of claim 9, wherein the one or more safety metrics for each partition candidate includes a distance metric that is determined using the agent distance to partition origin attribute and a degree metric that is determined using the agent interface degree attribute.

11. A wireless device, comprising:
at least one wireless interface;
at least one processor; and
a non-transitory computer readable medium communicatively coupled to the at least one processor, the non-transitory computer readable medium having stored thereon computer software comprising at least one set of instructions corresponding to an evaluating agent, that when executed by the at least processor, causes the wireless device to:
scan frequencies, using a first wireless interface or a second wireless interface, for broadcast messages of one or more other agents of one or more other wireless devices of a communication network disposed within a wireless communication range at time interval for the evaluating agent of a first wireless device;
wherein the evaluating agent is a first agent or a second agent of the wireless device, the first wireless interface is configured by the first agent of the wireless device to control the connectivity of the first agent to a partition of one or more other agents of the one or more other wireless devices and the second wireless interface is configured by the second agent of the wireless device to control the connectivity of the second agent to another partition of the one or more other agents of the one or more other wireless devices;
receive a broadcast message from each agent of the one or more other agents of each wireless device of the one or more other wireless devices;
wherein the broadcast message from each agent of the one or more other agents provides information regarding a state of each agent of the one or more other wireless devices and/or a state of each partition that includes at least one agent of the one or more other agents of the one or more other wireless devices;
the information including one or more partition parameters, one or more partition attributes, and one or more agent attributes;
the one or more partition parameters for each partition including (i) an agent interface degree bound that is a maximum number of neighbors of the evaluating agent in a partition and (ii) a distance to partition origin parameter that is a maximum number of hops of a shortest path between the evaluating agent and an agent of another wireless device designated as an origin node in the partition;
determine one or more metrics for each agent of the one or more other agents and/or for each partition of the one or more other agents using the information with respect to validity and/or a quality of a connection by the first agent or the second agent to each partition based on an agent type of the evaluating agent; and
determine one or more agent operations to be deployed by the first wireless interface or the second wireless interface of the first wireless device with respect to the first agent or the second agent, based on the one or more metrics and the agent type.

12. The device of claim 11, wherein:
each partition has a unique identifier, the unique identifier including a network id.

13. The device of claim 12, wherein:
each partition includes one wireless device designated as the origin node;
each origin node storing the one or more partition parameters and providing the unique identifier of respective partition,
each origin acts as a reference node of each partition; and
each origin node storing one or more parameters for the respective partition.

14. The device of claim 11, wherein the one or more agent operations includes determining one or more connectivity operations and one or more timing operations, the one or more connectivity operations including determining connectivity of the first agent or the second agent to a partition and the one or more timing operations including a time interval for initiating a next evaluation of connectivity by the evaluating agent.

15. The device of claim 14, wherein the medium storing instructions that, when executed, further cause the wireless device to:
configure the first wireless interface by the first agent or the second wireless interface by the second agent according to the one or more agent operations, respectively.

16. The device of claim 11, wherein the at least one wireless interface device includes the first wireless device and the second wireless device; and the evaluating agent includes the first agent and the second agent.

17. The device of claim 11, wherein the determine of the one or more metrics includes:
determine one or more safety metrics of each partition candidate identified in the one or messages received to determine validity of each partition candidate;
determine one or more quality metrics of each partition candidate determined to be valid based on the one or more safety metrics; and
select a partition candidate using the one or more quality metrics.

18. The device of claim 17, wherein the agent interface degree bound includes a first agent interface degree bound that is a maximum number of neighbors of a first agent in a partition, and a second agent interface degree bound that is a maximum number of neighbors of a second agent in the partition.

19. The device of claim 18, wherein the one or more agent attributes for each agent includes an agent distance to partition origin attribute that is a distance of an agent to the origin node of the respective partition; and an agent interface degree attribute that is a number of neighbors of the agent.

20. The device of claim 19, wherein the one or more safety metrics for each partition candidate includes a distance metric that is determined using the agent distance to partition origin attribute and a degree metric that is determined using the agent interface degree attribute.

* * * * *